United States Patent
Kakiuchi et al.

(10) Patent No.: US 11,958,975 B2
(45) Date of Patent: Apr. 16, 2024

(54) ASPHALT COMPOSITION

(71) Applicant: KAO CORPORATION, Tokyo (JP)

(72) Inventors: Hiroki Kakiuchi, Izumiotsu (JP); Ryoichi Hashimoto, Iwade (JP); Hirotaka Kashiwagi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 571 days.

(21) Appl. No.: 17/292,026

(22) PCT Filed: Nov. 12, 2019

(86) PCT No.: PCT/JP2019/044301
§ 371 (c)(1),
(2) Date: May 7, 2021

(87) PCT Pub. No.: WO2020/100881
PCT Pub. Date: May 22, 2020

(65) Prior Publication Data
US 2021/0395529 A1    Dec. 23, 2021

(30) Foreign Application Priority Data
Nov. 13, 2018    (JP) .................... 2018-213222

(51) Int. Cl.
*C08L 95/00*   (2006.01)
*C08G 63/181*  (2006.01)
*C08G 63/672*  (2006.01)

(52) U.S. Cl.
CPC ............ *C08L 95/00* (2013.01); *C08G 63/181* (2013.01); *C08G 63/672* (2013.01); *C08L 2555/80* (2013.01)

(58) Field of Classification Search
CPC .................................. C08L 95/00; C08L 67/02
See application file for complete search history.

(56) References Cited

U.S. PATENT DOCUMENTS

| | | | | |
|---|---|---|---|---|
| 4,316,829 | A * | 2/1982 | Roberts | C08L 95/00 523/214 |
| 5,460,649 | A * | 10/1995 | Strassman | E01C 7/265 106/668 |
| 10,662,110 | B2 | 5/2020 | Shirai | |
| 2005/0027071 | A1 | 2/2005 | Deeter et al. | |
| 2019/0135693 | A1* | 5/2019 | Shirai | C04B 26/26 |
| 2019/0233647 | A1 | 8/2019 | Takahashi et al. | |
| 2019/0359827 | A1 | 11/2019 | Shirai | |

FOREIGN PATENT DOCUMENTS

| | | |
|---|---|---|
| JP | 2000-169208 A | 6/2000 |
| JP | 2007-500768 A | 1/2007 |
| JP | 2018-3580 A | 1/2018 |
| JP | 2018-30996 A | 3/2018 |
| PL | 176601 B1 * | 6/1996 |
| WO | WO 2018/003151 A1 | 1/2018 |
| WO | WO 2018/134921 A1 | 7/2018 |

OTHER PUBLICATIONS

International Search Report, issued in PCT/JP2019/044301, dated Feb. 4, 2020.

* cited by examiner

*Primary Examiner* — Peter A Salamon
(74) *Attorney, Agent, or Firm* — Birch, Stewart, Kolasch & Birch, LLP

(57) ABSTRACT

An asphalt composition containing asphalt and polyester, wherein a content of asphaltene in the asphalt is 18% by mass or more and 40% by mass or less, and a content of the polyester is 1 part by mass or more and 10 parts by mass or less with respect to 100 parts by mass of the asphalt.

15 Claims, No Drawings

ASPHALT COMPOSITION

FIELD OF THE INVENTION

The present invention relates to an asphalt composition, an asphalt mixture, and a method for producing an asphalt mixture, which are used for road pavement.

BACKGROUND OF THE INVENTION

Asphalt pavement using an asphalt composition has been performed for paving driveways, parking spaces, cargo yards, sidewalks, etc., because of relatively easy construction and a short period of time from beginning of paving works to traffic start.

The asphalt pavement includes a road surface which is formed of an asphalt mixture containing aggregates bonded through asphalt, and hence, paved roads exhibit good hardness and good durability.

However, long-term use of asphalt pavement causes ruts and cracks, which require repair of the pavement, increase maintenance costs, and greatly affect automobile traffic.

JP 2000-169208 A (PTL 1) describes a waste toner-containing paving material containing 100 parts by weight of asphalt and 1 to 10 parts by weight of waste toner. It is described that a paving material excellent in fluidity resistance, abrasion resistance and cracking resistance is provided by blending waste toner which is a waste with the paving material, and waste toner conventionally treated as industrial waste is reused.

SUMMARY OF THE INVENTION

Embodiments of the present invention relate to the following [1] to [3].

[1] An asphalt composition containing asphalt and polyester, wherein a content of in the asphalt is 18% by mass or more and 40% by mass or less, and a content of the polyester is 1 part by mass or more and 10 parts by mass or less with respect to 100 parts by mass of the asphalt.

[2] An asphalt mixture containing the asphalt composition according to [1] and an aggregate.

[3] A method for producing an asphalt mixture, including a step of mixing a heated aggregate, asphalt, and polyester, wherein a content of asphaltene in the asphalt is 18% by mass or more and 40% by mass or less, and an addition amount of the polyester is 1 part by mass or more and 10 parts by mass or less with respect to 100 parts by mass of the asphalt.

DETAILED DESCRIPTION OF THE INVENTION

[Asphalt Composition]

The asphalt composition of the present invention (hereinafter also simply referred to as "asphalt composition") contains asphalt and polyester. The content of asphaltene in the asphalt is 18% by mass or more and 40% by mass or less. Further, the content of the polyester is 1 part by mass or more and 10 parts by mass or less with respect to 100 parts by mass of the asphalt.

According to the above, an asphalt composition excellent in durability of a pavement surface after construction (hereinafter also simply referred to as "durability") can be obtained. Further application of this technology can provide an asphalt mixture and a method for producing an asphalt mixture.

Conventionally, when a composition containing asphalt and polyester is used, an asphalt composition having a high drying strength can be obtained, but an asphalt composition capable of forming a pavement surface having excellent durability in which ruts are less likely to be formed is required.

In conventional asphalt, the hardness varies depending on the amount of asphaltene, and asphalt containing a large amount of asphaltene has a high hardness and a good resistance to a rut but has a low flow value. On the other hand, there is a problem that asphalt containing less asphaltene has a low hardness and a low resistance to a rut although it has a good flow value. In addition, there has been reported a technique of improving the resistance to a rut by adding polyester to asphalt, but there has been a problem that when a small amount of polyester is added, the effect of improving the resistance to a rut is low, and when a large amount of polyester is added, the brittleness of polyester appears in the asphalt composition, and the flow value is decreased. In addition, although the polyester is uniformly dispersed immediately after the addition of the asphalt, there is a problem that the polyester is precipitated in a lower portion when stored at a high temperature for a long period of time, and the uniformity of the composition is reduced.

The present inventors have found that by setting the amount of asphaltene and the addition amount of polyester within predetermined ranges, the resistance to a rut, the flow value, and the storage stability can all be improved, unlike the tendency of conventional asphalt. The reason why the effect of the present invention is obtained is not clear, but is estimated as follows.

Since the asphalt composition of the present invention contains the polyester, the polyester is melted and dispersed in the asphalt, covers the surface of the aggregate when the asphalt composition comes into contact with the aggregate (fine aggregate), and increases the adhesive strength between the aggregates. Asphalt contains various compounds such as saturated aliphatic compounds, low molecular weight aromatic compounds, resins, and asphaltenes. Among them, asphaltene is adsorbed to polyester and fine aggregate to form an asphaltene-polyester-fine aggregate composite. The composite connects coarse aggregates to each other and suppresses the movement of the aggregate, and improves the durability of the pavement surface after construction. Therefore, it is considered that by using asphalt having a high content of asphaltene of 18% by mass or more and 40% by mass or less, formation of an asphaltene-polyester-fine aggregate composite is promoted, and the durability of the pavement surface after construction can be efficiently improved. Although the conventional high-asphaltene network structure is very strong, it is presumed that the polyester and the asphaltene interact with each other to form a composite, thereby forming a network structure having flexibility, whereby the resistance to a rut, the flow value, and the storage stability all are improved. In addition, the higher the acid value of the polyester is, the more easily the polyester and the asphaltene interact with each other, and the above-described mechanism is promoted.

Definitions and the like of various terms in the description herein are shown below.

The "binder mixture" means a mixture containing asphalt and a thermoplastic elastomer, and is a concept including, for example, asphalt modified with a thermoplastic elastomer described later (hereinafter also referred to as "modified asphalt").

In the polyester, the "alcohol component-derived constituent unit" means a structure resulting from eliminating a hydrogen atom from the hydroxy group of the alcohol component; and the "carboxylic acid component-derived constituent unit" means a structure resulting from eliminating a hydroxy group from the carboxy group of the carboxylic acid component.

The "carboxylic acid compound" is a concept including not only the carboxylic acid but also an anhydride which is decomposed during the reaction to produce an acid, and an alkyl ester of the carboxylic acid (for example, an alkyl ester in which the alkyl group has 1 to 3 carbon atoms). When the carboxylic acid compound is an alkyl ester of a carboxylic acid, the number of carbon atoms of the alkyl group which is an alcohol residue of the ester is not counted in the number of carbon atoms of the carboxylic acid compound.

[Asphalt]

As the asphalt, for example, various kinds of asphalts can be used. For example, in addition to straight asphalt which is petroleum asphalt for paving, modified asphalt is mentioned. Examples of the modified asphalt include blown asphalt; asphalt modified with a polymeric material such as a thermoplastic elastomer and a thermoplastic resin. The straight asphalt means a residual bituminous substance obtained by treating crude oil with an atmospheric distillation apparatus, a vacuum distillation apparatus or the like. The blown asphalt means an asphalt obtained by heating a mixture of straight asphalt and a heavy oil and then blowing air to oxidize the mixture. From the viewpoint of durability, modified asphalt is preferable.

In the present invention, the content of asphaltene in the asphalt is 18% by mass or more, preferably 20% by mass or more, and more preferably 25% by mass or more base on 100% by mass of the asphalt from the viewpoint of improving the durability of the pavement surface after construction, and is 40% by mass or less, preferably 38% by mass or less, and more preferably 36% by mass or less from the viewpoint of cracking resistance.

The content of asphaltene in asphalt is a value measured by "Method for analyzing composition of asphaltene by column chromatography" specified by the Japan Petroleum Institute Standards JPI-5S-22-83.

The content of asphalt in the asphalt composition is preferably 60% by mass or more, more preferably 70% by mass or more, still more preferably 75% by mass or more, and even more preferably 80% by mass or more, and is preferably 98% by mass or less, more preferably 96% by mass or less, and still more preferably 95% by mass or less, based on 100% by mass of the asphalt composition.

[Thermoplastic Elastomer]

The asphalt composition preferably contains a thermoplastic elastomer. Asphalt and thermoplastic elastomers are preferably used as a binder mixture, which is a mixture thereof. Examples of the binder mixture include straight asphalt modified with a thermoplastic elastomer (modified asphalt).

Examples of the thermoplastic elastomer include at least one selected from the group consisting of a styrene/butadiene block copolymer (hereinafter also simply referred to as "SB"), a styrene/butadiene/styrene block copolymer (hereinafter also simply referred to as "SBS"), a styrene/butadiene random copolymer (hereinafter also simply referred to as "SBR"), a styrene/isoprene block copolymer (hereinafter also simply referred to as "SI"), a styrene/isoprene/styrene block copolymer (hereinafter also simply referred to as "SIS"), a styrene/isoprene random copolymer (hereinafter also simply referred to as "SIR"), an ethylene/vinyl acetate copolymer, and an ethylene/acrylic ester copolymer.

Examples of commercially available products of the ethylene/acrylic ester copolymer include "Elvaroy" (manufactured by Du Pont).

Among these thermoplastic elastomers, from the viewpoint of further improving durability, at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer is preferable, and at least one selected from the group consisting of a styrene/butadiene random copolymer and a styrene/butadiene/styrene block copolymer is more preferable.

The content of the thermoplastic elastomer in the asphalt composition is preferably 0.1% by mass or more, more preferably 0.5% by mass or more, still more preferably 1% by mass or more, and even more preferably 2% by mass or more, and is preferably 30% by mass or less, more preferably 20% by mass or less, still more preferably 10% by mass or less, and even more preferably 5% by mass or less, based on 100% by mass of the asphalt composition, from the viewpoint of further improving durability.

In the asphalt composition, the ratio of the thermoplastic elastomer is preferably 0.1 parts by mass or more, more preferably 0.5 parts by mass or more, still more preferably 1 part by mass or more, and even more preferably 2 parts by mass or more, and is preferably 30 parts by mass or less, more preferably 20 parts by mass or less, still more preferably 10 parts by mass or less, and even more preferably 5 parts by mass or less, with respect to 100 parts by mass of the asphalt, from the viewpoint of further improving durability

[Polyester]

The polyester preferably contains an alcohol component-derived constituent unit containing 60 mol % or more of an alkylene oxide adduct of bisphenol A and a carboxylic acid component-derived constituent unit from the viewpoint of further improving the durability of the pavement surface after construction. Further, the polyester preferably contains an aromatic dicarboxylic acid compound in an amount of 50 mol % or more in the carboxylic acid component from the viewpoint of further improving durability <Alcohol Component>

Examples of the alcohol component include a diol and a polyhydric alcohol having trihydric or higher and octahydric or lower. Examples of the diol include an aliphatic diol and an aromatic diol. These alcohol components may be used alone or in combination of two or more thereof.

Examples of the aliphatic diol include aliphatic diols having 2 to 20 carbon atoms. Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

The trihydric or higher polyhydric alcohol is, for example, a trihydric alcohol. Examples of the trihydric or higher polyhydric alcohol include glycerin.

From the viewpoint of obtaining excellent durability, the alcohol component preferably contains an alkylene oxide adduct of bisphenol A, and more preferably contains an alkylene oxide adduct of bisphenol A represented by the following formula (I):

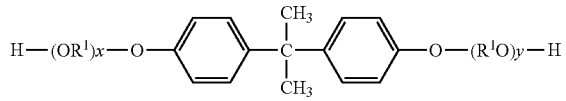

(I)

wherein each of $OR^1$ and $R^1O$ represents an alkylene oxide, $R^1$ represents an alkylene group having 2 or 3 carbon atoms, each of x and y represents a positive number expressing an average addition molar number of the alkylene oxide, and a sum total of x and y is preferably 1 or more, and more preferably 1.5 or more, and is preferably 16 or less, more preferably 8 or less, and still more preferably 4 or less.

A polyester containing an alcohol component-derived constituent unit containing 60 mol % or more of an alkylene oxide adduct of bisphenol A is preferable because when the asphalt is an asphalt modified with a thermoplastic elastomer, the durability of the pavement surface after construction can be further improved. In particular, among thermoplastic elastomers, SBS and SBR described later are likely to exhibit this effect.

Examples of the alkylene oxide adduct of bisphenol A represented by the formula (I) include a propylene oxide adduct of bisphenol A [2,2-bis(4-hydroxyphenyl)propane] and an ethylene oxide adduct of bisphenol A. Of these, a combination of a propylene oxide adduct of bisphenol A and an ethylene oxide adduct of bisphenol A is preferable.

The amount of the alkylene oxide adduct of bisphenol A in the alcohol component is preferably 65 mol % or more, and more preferably 80 mol % or more, and 100 mol % or less, based on 100 mol % of the alcohol component, from the viewpoint of enhancing melt dispersibility in asphalt and obtaining excellent durability.

The molar ratio of the propylene oxide adduct of bisphenol A/the ethylene oxide adduct of bisphenol A in the alcohol component is preferably 5/95 or more, and more preferably 10/90 or more, and from the viewpoint of further enhancing melt dispersibility in asphalt and obtaining excellent durability, the molar ratio is preferably 50/50 or less, more preferably 40/60 or less, and still more preferably 30/70 or less.

<Carboxylic Acid Component>

Examples of the carboxylic acid component include an aliphatic dicarboxylic acid compound, an aromatic dicarboxylic acid compound, and a polybasic carboxylic acid compound having tribasic or higher and hexabasic or lower. These carboxylic acid components may be used alone or in combination of two or more thereof.

The number of carbon atoms of the main chain of the aliphatic dicarboxylic acid is preferably 3 or more, and more preferably 4 or more, and is preferably 10 or less, and more preferably 8 or less, from the viewpoint of further improving durability.

Examples of the aliphatic dicarboxylic acid compound include fumaric acid, maleic acid, oxalic acid, malonic acid, citraconic acid, itaconic acid, glutaconic acid, succinic acid, adipic acid, suberic acid, azelaic acid, sebacic acid, dodecanedioic acid, succinic acid substituted with an alkyl group having 1 to 20 carbon atoms or an alkenyl group having 2 to 20 carbon atoms, anhydrides thereof, and alkyl esters thereof (for example, alkyl esters in which the alkyl group has 1 to 3 carbon atoms). Examples of the substituted succinic acid include dodecylsuccinic acid, dodecenylsuccinic acid, and octenylsuccinic acid. Among the above-described aliphatic dicarboxylic acid compounds, at least one selected from the group consisting of fumaric acid, maleic acid, and adipic acid is preferable, and adipic acid is more preferable.

The content of the aliphatic dicarboxylic acid compound in the carboxylic acid component is preferably 1 mol % or more, more preferably 5 mol % or more, and still more preferably 10 mol % or more, and is preferably 30 mol % or less, and more preferably 25 mol % or less, based on 100 mol % of the carboxylic acid component, from the viewpoint of further improving the durability by increasing the flexibility of the polyester.

Examples of the aromatic dicarboxylic acid compound include terephthalic acid, phthalic acid, isophthalic acid, naphthalene dicarboxylic acid, anhydrides thereof, and alkyl esters thereof (for example, alkyl esters in which the alkyl group has 1 to 3 carbon atoms). Among the above-described aromatic dicarboxylic acid compounds, at least one selected from the group consisting of terephthalic acid and isophthalic acid is preferable, and terephthalic acid is more preferable from the viewpoint of further improving durability.

The content of the aromatic dicarboxylic acid compound in the carboxylic acid component is preferably 50 mol % or more, more preferably 65 mol % or more, and still more preferably 70 mol % or more, and is preferably 99 mol % or less, more preferably 95 mol % or less, and still more preferably 90 mol % or less, based on 100 mol % of the carboxylic acid component, from the viewpoint of obtaining excellent durability.

(Molar Ratio of Carboxylic Acid Component-Derived Constituent Unit to Alcohol Component-Derived Constituent Unit)

The molar ratio of the carboxylic acid component-derived constituent unit to the alcohol component-derived constituent unit [carboxylic acid component/alcohol component] is preferably 0.7 or more, and more preferably 0.8 or more, and is preferably 1.5 or less, more preferably 1.3 or less, and still more preferably 1.1 or less, from the viewpoint of adjusting the acid value.

(Properties of Polyester)

The softening point of the polyester is preferably 90° C. or higher, more preferably 95° C. or higher, and still more preferably 100° C. or higher, and is preferably 140° C. or lower, more preferably 130° C. or lower, still more preferably 125° C. or lower, even more preferably 120° C. or lower, and even more preferably 115° C. or lower, from the viewpoint of obtaining durability.

The acid value of the polyester is preferably 2 mgKOH/g or more, more preferably 3 mgKOH/g or more, still more preferably 4 mgKOH/g or more, and even more preferably 5 mgKOH/g or more, from the viewpoint of promoting adsorption to aggregate and further improving durability, and is preferably 30 mgKOH/g or less, more preferably 20 mgKOH/g or less, and still more preferably 18 mgKOH/g or less, from the viewpoint of improving water resistance of the pavement surface.

The hydroxyl value of the polyester is preferably 1 mgKOH/g or more, more preferably 2 mgKOH/g or more, still more preferably 5 mgKOH/g or more, and even more preferably 10 mgKOH/g or more, and is preferably 70 mgKOH/g or less, more preferably 50 mgKOH/g or less, still more preferably 30 mgKOH/g or less, even more preferably 20 mgKOH/g or less, even more preferably less than 20 mgKOH/g, and even more preferably 18 mgKOH/g or less, from the viewpoint of further improving durability.

The glass transition point of the polyester is preferably 40° C. or higher, and more preferably 45° C. or higher, and is preferably 80° C. or lower, more preferably 70° C. or lower, and still more preferably 60° C. or lower, from the viewpoint of obtaining durability and improving fluidity resistance at a high temperature.

The softening point, the acid value, the hydroxyl value, and the glass transition point can be measured by the methods described in Examples. The softening point, the acid value, the hydroxyl value, and the glass transition point can be adjusted by a raw material monomer composition, a molecular weight, a catalyst amount, or reaction conditions.
(Method for Producing Polyester)

Although a method for producing the polyester is not particularly limited, for example, the polyester may be produced by subjecting the alcohol component and the carboxylic acid component as described above to polycondensation.

The temperature of the polycondensation reaction is not particularly limited, but is preferably 160° C. or higher and 260° C. or lower from the viewpoint of reactivity.

In the polycondensation reaction, a tin (II) compound having no Sn—C bond such as tin (II) di(2-ethylhexanoate) may be used as a catalyst in an amount of preferably 0.01 parts by mass or more, and more preferably 0.2 parts by mass or more, and preferably 1.5 parts by mass or less, and more preferably 0.6 parts by mass or less, with respect to 100 parts by mass of the total amount of the alcohol component and the carboxylic acid component.

In the polycondensation reaction, in addition to the catalyst, a pyrogallol compound such as gallic acid may be used as an esterification catalyst in an amount of preferably 0.001 parts by mass or more, more preferably 0.005 parts by mass or more, and still more preferably 0.01 parts by mass or more, and preferably 0.15 parts by mass or less, more preferably 0.10 parts by mass or less, and still more preferably 0.05 parts by mass or less, with respect to 100 parts by mass of the total amount of the alcohol component and the carboxylic acid component.
(Content of Polyester)

The content of the polyester in the asphalt composition is 1 part by mass or more, preferably 2 parts by mass or more, and more preferably 3 parts by mass or more from the viewpoint of improving durability, and is 10 parts by mass or less, preferably 7 parts by mass or less, more preferably 5 parts by mass or less, and still more preferably 4 parts by mass or less from the viewpoint of reducing cost and cracking resistance, with respect to 100 parts by mass of the asphalt.
[Dispersant]

The asphalt composition may include a dispersant.

The dispersant is preferably one that is dissolved in asphalt and has affinity with polyester.

Examples of the dispersant include a polymer dispersant and a surfactant such as polyoxyethylene alkylamine and alkanolamine.

Examples of the polymer dispersant include a polyamidoamine and a salt thereof, a polycarboxylic acid and a salt thereof, a high molecular weight unsaturated acid ester, a modified polyurethane, a modified polyester, a modified poly(meth)acrylate, a (meth)acrylic copolymer, and a naphthalenesulfonic acid-formalin condensate. These dispersants may be used alone or in combination of two or more thereof.

The dispersant is preferably a polymer dispersant from the viewpoint of improving high-temperature storage stability. The "polymer dispersant" in the present invention means a dispersant having a weight average molecular weight of 1,000 or more. The weight average molecular weight is preferably 2,000 or more, and more preferably 4,000 or more, and is preferably 80,000 or less, and more preferably 40,000 or less, although depending on the type of polymer.

The dispersant preferably has a basic functional group. The basic functional group means a group in which the pKa of the conjugate acid is −3 or more. Examples of the basic functional group include an amino group, an imino group, and a quaternary ammonium group.

The base value of the dispersing agent is preferably 10 mgKOH/g or more, more preferably 20 mgKOH/g or more, and still more preferably 30 mgKOH/g or more, and is preferably 150 mgKOH/g or less, more preferably 120 mgKOH/g or less, and still more preferably 100 mgKOH/g or less. The base value is measured in accordance with JIS K7237:1995.

Examples of commercially available dispersants include "DISPER" series "byk-101", "byk-130", "byk-161", "byk-162", "byk-170", "byk-2020", "byk-2164", and "byk-LPN21324" (manufactured by BYK-Chemie); "Solsperse" series "9000", "11200", "13240", "13650", "13940", "17000", "18000", "24000", "28000", "32000", "38500", and "71000" (manufactured by The Lubrizol Corporation); "AJISPER" series "PB821", "PB822", "PB880", and "PB881" (manufactured by Ajinomoto Fine-Techno Co., Inc.); "Efka" series "46", "47", "48", "49", "4010", "4047", "4050", "4165", and "5010" (manufactured by BASF); "Flowlen TG-710" (manufactured by Kyoeisha Chemical Co., Ltd.); and "TAMN-15" (manufactured by Nikko Chemicals Co., Ltd.).

The content of the dispersant is preferably 1 part by mass or more, more preferably 3 parts by mass or more, and still more preferably 4 parts by mass or more, and is preferably 80 parts by mass or less, more preferably 60 parts by mass or less, still more preferably 40 parts by mass or less, even more preferably 30 parts by mass or less, and even more preferably 20 parts by mass or less, with respect to 100 parts by mass of the polyester.
[Asphalt Mixture]

An asphalt mixture according to an embodiment of the present invention contains the above-described asphalt composition and an aggregate. That is, the asphalt mixture contains asphalt, polyester, and an aggregate, and preferably contains asphalt, a thermoplastic elastomer, polyester, and an aggregate.

The content of the asphalt composition in the asphalt mixture is preferably 2% by mass or more, more preferably 3% by mass or more, and still more preferably 4% by mass or more, and is preferably 15% by mass or less, more preferably 10% by mass or less, and still more preferably 8% by mass or less, based on 100% by mass of the asphalt mixture, from the viewpoint of further improving durability.
[Aggregate]

As the aggregate, for example, crushed stone, cobble stone, gravel, sand, regenerated aggregate, ceramics and the like can be arbitrarily selected and used. As the aggregate, any of coarse aggregate having a particle diameter of 2.36 mm or more and fine aggregate having a particle diameter of less than 2.36 mm can be used.

Examples of the coarse aggregate include crushed stone having a particle diameter range of 2.36 mm or more and 4.75 mm or less, crushed stone having a particle diameter range of 4.75 mm or more and 12.5 mm or less, crushed stone having a particle diameter range of 12.5 mm or more and 19 mm or less, and crushed stone having a particle diameter range of 19 mm or more and 31.5 mm or less.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and regenerated aggregate-crushed sand.

The particle diameter is a value defined in JIS A5001: 1995.

Of these, a combination of coarse aggregate and fine aggregate is preferred.

The fine aggregate may contain a filler (for example, sand) having a particle diameter of less than 0.075 mm. Examples of the filler include sand, fly ash, calcium carbonate, and slaked lime. Among these, calcium carbonate is preferable from the viewpoint of improving the drying strength.

The average particle diameter of the filler is preferably 0.001 mm or more, and is preferably 0.05 mm or less, more preferably 0.03 mm or less, and still more preferably 0.02 mm or less, from the viewpoint of improving the drying strength. The average particle diameter of the filler can be measured with a laser diffraction type particle size distribution measuring apparatus. Here, the average particle diameter means an average particle diameter having a cumulative volume of 50%.

[Measurement Method for Average Particle Diameter of Filler]

The average particle diameter of the filler is a value measured under the following conditions using a laser diffraction type particle size distribution measuring apparatus "LA-950" (manufactured by Horiba, Ltd.)

Measurement method: Flow method
Dispersion medium: Ethanol
Sample preparation: 2 mg/100 mL
Dispersing method: Stirring and 1 minute of built-in ultrasonic waves The mass ratio of the coarse aggregate to the fine aggregate is preferably 10/90 or more, more preferably 20/80 or more, and still more preferably 30/70 or more, and is preferably 90/10 or less, more preferably 80/20 or less, and still more preferably 70/30 or less.

The content of the aggregate is preferably 1,000 parts by mass or more, more preferably 1,200 parts by mass or more, and still more preferably 1,400 parts by mass or more, and is preferably 3,000 parts by mass or less, more preferably 2,500 parts by mass or less, and still more preferably 2,000 parts by mass or less, with respect to 100 parts by mass of the total of the asphalt, the thermoplastic elastomer, and the polyester.

Suitable blending examples of the asphalt mixture are as follows.

(1) An example of the asphalt mixture includes, for example, 30% by volume or more and less than 45% by volume of the coarse aggregate, 30% by volume or more and 50% by volume or less of the fine aggregate, and 5% by volume or more and 10% by volume or less of the asphalt composition (fine-graded asphalt).

(2) An example of the asphalt mixture includes, for example, 45% by volume or more and less than 70% by volume of the coarse aggregate, 20% by volume or more and 45% by volume or less of the fine aggregate, and 3% by volume or more and 10% by volume or less of the asphalt composition (dense-graded asphalt).

(3) An example of the asphalt mixture includes, for example, 70% by volume or more and 80% by volume or less of the coarse aggregate, 10% by volume or more and 20% by volume or less of the fine aggregate, and 3% by volume or more and 10% by volume or less of the asphalt composition (porous asphalt).

The asphalt mixture may further contain other components, if necessary.

The blending ratio of the asphalt in the conventional asphalt mixture containing the aggregate and the asphalt is usually used in accordance with the optimum asphalt amount obtained from "Formulation and Design of Asphalt Mixture" as described in "Guideline for Pavement Design and Construction" published by Japan Road Association.

In the description herein, the optimum asphalt amount corresponds to the total amount of the asphalt, the thermoplastic elastomer and the polyester. Therefore, it is usually preferable that the optimum asphalt amount is the total amount of the asphalt, the thermoplastic elastomer and the polyester.

However, it is not needed to limit to the optimum asphalt amount to the method as described in "Guideline for Pavement Design and Construction", and it may also be determined by any other methods.

[Production Method of Asphalt Mixture]

The method for producing an asphalt mixture of the present invention includes a step of mixing a heated aggregate, asphalt, and a polyester, and preferably includes a step of mixing a heated aggregate, asphalt, a thermoplastic elastomer, and a polyester. From the viewpoint of improving durability, it is important that the content of asphaltene in the asphalt is 18% by mass or more and 40% by mass or less based on 100% by mass of the asphalt, and the addition amount of the polyester is 1 part by mass or more and 10 parts by mass or less with respect to 100 parts by mass of the asphalt.

Specific examples of the method for producing an asphalt mixture include conventional methods for producing an asphalt mixture called a plant mix method and a premix method. Both are methods of adding asphalt (and a thermoplastic elastomer, if necessary) and polyester to the heated aggregate. Examples of the addition method include a premix method in which asphalt (and a thermoplastic elastomer, if necessary) and polyester are dissolved in advance, and a plant mix method in which modified asphalt in which a thermoplastic elastomer is dissolved in asphalt is added and then polyester is added. Of these, the premix method is preferable.

More specifically, in the method for producing an asphalt mixture, in the mixing step, preferably (i) asphalt (and a thermoplastic elastomer, if necessary) is added to and mixed with a heated aggregate, and then polyester is added thereto and mixed, (ii) asphalt (and a thermoplastic elastomer, if necessary) and polyester are simultaneously added to and mixed with a heated aggregate, or (iii) a mixture of asphalt (and a thermoplastic elastomer, if necessary) and polyester heated and mixed in advance is added to and mixed with a heated aggregate.

Of these, the method (iii) is preferable.

The temperature at which the asphalt and the polyester are mixed in advance in the method (iii) is preferably higher than the softening point of the polyester, preferably 130° C. or higher, more preferably 150° C. or higher, still more preferably 170° C. or higher, and even more preferably 180° C. or higher from the viewpoint of durability, and is preferably 230° C. or lower, more preferably 210° C. or lower, and still more preferably 200° C. or lower from the viewpoint of preventing thermal degradation of the asphalt. The mixing time is, for example, 10 minutes or more, preferably 30 minutes or more, more preferably 1 hour or more, and still more preferably 2 hours or more. The upper limit of the time is not particularly limited, but is, for example, about 5 hours.

The temperature of the heated aggregate in the methods (i) to (iii) is preferably higher than the softening point of the polyester, preferably 130° C. or higher, more preferably 150° C. or higher, still more preferably 170° C. or higher, and even more preferably 180° C. or higher from the viewpoint of durability, and it is preferably 230° C. or lower, more preferably 210° C. or lower, and still more preferably 200° C. or lower from the viewpoint of preventing thermal degradation of the asphalt.

In the mixing step, the mixing temperature is preferably a temperature higher than the softening point of the polyester, preferably 130° C. or higher, more preferably 150° C. or higher, still more preferably 170° C. or higher, and even more preferably 180° C. or higher, and it is preferably 230° C. or lower, more preferably 210° C. or lower, and still more preferably 200° C. or lower from the viewpoint of preventing thermal degradation of the asphalt. The mixing time in the mixing step is, for example, 30 seconds or more, preferably 1 minute or more, more preferably 2 minutes or more, and still more preferably 5 minutes or more, and the upper limit of the time is not particularly limited, but is, for example, about 30 minutes.

The method for producing an asphalt mixture preferably includes, after the mixing step, a step of holding the obtained mixture at a temperature higher than or equal to the softening point of the polyester from the viewpoint of further improving durability.

In the holding step, the mixture may be further mixed, but the temperature may be held at the above-described temperature or higher.

In the holding step, the mixing temperature is preferably higher than the softening point of the polyester, preferably 130° C. or higher, more preferably 150° C. or higher, still more preferably 170° C. or higher, and even more preferably 180° C. or higher, and it is preferably 230° C. or lower, more preferably 210° C. or lower, and still more preferably 200° C. or lower from the viewpoint of preventing thermal deterioration of the asphalt composition. The holding time in the holding step is preferably 0.5 hours or more, more preferably 1 hour or more, and still more preferably 1.5 hours or more, and the upper limit of the time is not particularly limited, but is, for example, about 5 hours.

[Road Paving Method]

The asphalt mixture is used for road paving.

The road paving method preferably includes a step of using the asphalt mixture described above for a construction to form an asphalt paving material layer.

The asphalt paving material layer is preferably a base layer or a surface layer.

The asphalt mixture may be subjected to compacting laying by a similar method using a known construction machine arrangement. When the asphalt mixture is used as a heated asphalt mixture, the compacting laying temperature is preferably higher than the softening point of the polyester, preferably 100° C. or higher, more preferably 120° C. or higher, and still more preferably 130° C. or higher, and is preferably 200° C. or lower, and more preferably 180° C. or lower.

According to the present invention, it is possible to provide an asphalt composition having excellent durability of the pavement surface after construction, an asphalt mixture, and a method for producing an asphalt mixture.

EXAMPLES

The properties of the resins and the like were measured and evaluated by the following methods.

[Measurement Method]

[Acid Value and Hydroxyl Value of Polyester]

The acid value and the hydroxyl value of the polyester were measured according to JIS K0070:1992. However, only the measurement solvent was changed from the mixed solvent of ethanol and ether specified in JIS K0070:1992 to the mixed solvent of acetone and toluene (acetone:toluene=1:1 (volume ratio)).

[Softening Point and Glass Transition Point of Polyester]

(1) Softening Point

Using a flow tester "CFT-500D" (manufactured by Shimadzu Corporation), 1 g of a sample was extruded from a nozzle having a diameter of 1 mm and a length of 1 mm by applying a load of 1.96 MPa with a plunger while heating the sample at a temperature increase rate of 6° C./min. The amount of descent of the plunger of the flow tester was plotted against the temperature, and the temperature at which half of the sample flowed out was taken as the softening point.

(2) Glass Transition Point

Using a differential scanning calorimeter "Q-100" (manufactured by TA Instruments Japan Inc.), 0.01 to 0.02 g of samples were weighed in an aluminum pan, heated to 200° C., and cooled from that temperature to 0° C. at a temperature decrease rate of 10° C./min. Next, the measurement was performed while the temperature was raised to 150° C. at a temperature increase rate of 10° C./min. The temperature at the intersection of the extension of the baseline below the maximum endothermic peak temperature and the tangent showing the maximum slope from the rising portion of the peak to the top of the peak was taken as the glass transition point.

[Content of Asphaltene in Asphalt]

The content of asphaltene in the asphalt was measured by "Method for analyzing composition of asphaltene by column chromatography" specified by the Japan Petroleum Institute Standards JPI-5S-22-83.

Production Examples 1 to 3

(Production of Polyester Resins (A1) to (A3))

The alcohol component and terephthalic acid of the polyester shown in Table 1 were put into a 5-liter four-necked flask equipped with a thermometer, a stainless steel stirring rod, a flow-down type condenser, and a nitrogen inlet tube, 20 g of tin (II) di(2-ethylhexanoate) and 2 g of gallic acid were added under a nitrogen gas atmosphere, and the temperature was raised to 235° C. over 3 hours in a mantle heater, the temperature was kept at 235° C. for 7 hours, and the reaction was carried out under reduced pressure at 8.0 kPa for 1 hour.

Thereafter, after cooling to 180° C., the remaining acid was added, and the temperature was raised to 210° C. over 2 hours and then kept at 210° C. for 1 hour. After the reaction under reduced pressure was carried out at 8.0 kPa, the reaction was carried out until the softening point shown in Table 1 was reached, and target polyester resins (A1) to (A3) were obtained, respectively.

TABLE 1

|  |  | Production Example | | | | | |
|---|---|---|---|---|---|---|---|
|  |  | 1 | | 2 | | 3 | |
|  |  | Resin | | | | | |
|  |  | A1 | | A2 | | A3 | |
|  |  | Raw material unit amount | | | | | |
|  |  | Charged amount (g) | Molar ratio *3 | Charged amount (g) | Molar ratio *3 | Charged amount (g) | Molar ratio *3 |
|  | Alcohol component BPA-PO *1 | 710 | 25 | 726 | 25 | 694 | 25 |
|  | BPA-EO *2 | 1977 | 75 | 2023 | 75 | 1932 | 75 |
|  | Carboxylic acid component Terephthalic acid | 1077 | 80 | 1025 | 74.4 | 1126 | 85.6 |
|  | Adipic acid | 237 | 20 | 225 | 18.6 | 248 | 21.4 |
| Properties | Softening point (° C.) | 103.6 | | 100.3 | | 102.1 | |
|  | Acid value (mgKOH/g) | 12.7 | | 2.7 | | 23.4 | |
|  | Hydroxyl value (mgKOH/g) | 13.3 | | 26.9 | | 8.9 | |
|  | Glass transition point (° C.) | 57.8 | | 55.9 | | 57.2 | |

*1: BPA-PO: Polyoxypropylene (2.2) adduct of bisphenol A
*2: BPA-EO: Polyoxyethylene (2.2) adduct of bisphenol A
*3: Molar amount (molar ratio) with respect to 100 moles of the alcohol component Example 1

As a binder mixture, 2200 g of modified asphalt containing 3% by mass of SBS (manufactured by Ergon, Inc., Texas, asphaltene concentration in asphalt: 22% by mass) heated to 180° C. was placed in a stainless steel vessel of 3 L and stirred in 100 rpm, and 110 g of a polyester resin (A1) (5 parts by mass with respect to 100 parts by mass of asphalt) was gradually added and stirred in 300 rpm for 2 hours to prepare an asphalt composition (AS-1).

Next, 11 kg of aggregate (composition of aggregate see below) heated to 180° C. was then placed in an asphalt mixer and mixed at 180° C. for 60 seconds.

Then, 634 g of the asphalt composition (AS-1) was added and mixed in an asphalt mixer for 2 minutes. The obtained asphalt mixture was stored at 180° C. for 2 hours, then filled in a formwork of 300×300×50 cm, and subjected to a 25-rotation pressure treatment at a temperature of 150° C. and a load of 0.44 kPa using a roller compactor (manufactured by Iwata Kogyosho K.K.) to prepare a test piece.

<Composition of Aggregate>
No. 6 Crushed stone: 50.9 parts by mass
Crushed sand 1: 10.4 parts by mass
Crushed sand 2: 22.1 parts by mass
Fine sand: 10.4 parts by mass
Stone dust: 6.2 parts by mass Passing % by Mass:
Sieve mesh 15 mm: 100% by mass
Sieve mesh 10 mm: 85.6% by mass
Sieve mesh 5 mm: 49.7% by mass
Sieve mesh 2.5 mm: 44.6% by mass
Sieve mesh 1.2 mm: 31.6% by mass
Sieve mesh 0.6 mm: 21.3% by mass
Sieve mesh 0.3 mm: 12.7% by mass
Sieve mesh 0.15 mm: 7.1% by mass Example 2

An asphalt composition (AS-2) was obtained in the same manner as in Example 1 except that the addition amount of the polyester resin (A1) in Example 1 was changed to 176 g (8 parts by mass with respect to 100 parts by mass of asphalt).

A test piece was obtained in the same manner as in Example 1 except that 634 g of the asphalt composition (AS-1) in Example 1 was changed to 652 g of the asphalt composition (AS-2).

Example 3

An asphalt composition (AS-3) was obtained in the same manner as in Example 1 except that the addition amount of the polyester resin (A1) in Example 1 was changed to 66 g (3 parts by mass with respect to 100 parts by mass of asphalt).

A test piece was obtained in the same manner as in Example 1 except that 634 g of the asphalt composition (AS-1) in Example 1 was changed to 621 g of the asphalt composition (AS-3).

Comparative Example 1

An asphalt composition (AS-C1) was obtained in the same manner as in Example 1 except that the addition amount of the polyester (A1) in Example 1 was changed to 440 g (20 parts by mass with respect to 100 parts by mass of asphalt).

A test piece was obtained in the same manner as in Example 1 except that 634 g of the asphalt composition (AS-1) in Example 1 was changed to 724 g of the asphalt composition (AS-C1).

Comparative Example 2

An asphalt composition (AS-C2) was obtained in the same manner as in Example 1 except that the polyester resin (A1) in Example 1 was not added.

A test piece was obtained in the same manner as in Example 1 except that 634 g of the asphalt composition (AS-1) in Example 1 was changed to 603 g of the asphalt composition (AS-C2).

Example 4

An asphalt composition (AS-4) was obtained in the same manner as in Example 2 except that the asphalt in Example 2 was changed to modified asphalt containing 3% by mass of SBS (manufactured by Mexico FESPA, asphaltene concentration in asphalt: 28% by mass).

A test piece was obtained in the same manner as in Example 1 except that 634 g of the asphalt composition (AS-1) in Example 1 was changed to 652 g of the asphalt composition (AS-4).

Example 5

An asphalt composition (AS-5) was obtained in the same manner as in Example 4 except that the addition amount of the polyester resin (A1) in Example 4 was changed to 66 g (3 parts by mass with respect to 100 parts by mass of asphalt).

A test piece was obtained in the same manner as in Example 1 except that 634 g of the asphalt composition (AS-1) in Example 1 was changed to 621 g of the asphalt composition (AS-5).

Comparative Example 3

An asphalt composition (AS-C3) was obtained in the same manner as in Example 4 except that the polyester resin (A1) in Example 4 was not added.

A test piece was obtained in the same manner as in Example 1 except that 634 g of the asphalt composition (AS-1) in Example 1 was changed to 608 g of the asphalt composition (AS-C3).

Comparative Example 4

An asphalt composition (AS-C4) was obtained in the same manner as in Example 1 except that the asphalt in Example 1 was changed to modified asphalt containing 3% by mass of SBS (manufactured by Japan Toa Road Corporation, asphaltene concentration in asphalt: 15% by mass).

A test piece was obtained in the same manner as in Example 1 except that 634 g of the asphalt composition (AS-1) in Example 1 was changed to 634 g of the asphalt composition (AS-C4).

Comparative Example 5

An asphalt composition (AS-C5) was obtained in the same manner as in Comparative Example 4 except that the addition amount of the polyester resin (A1) in Comparative Example 4 was changed to 440 g (20 parts by mass with respect to 100 parts by mass of asphalt).

A test piece was obtained in the same manner as in Example 1 except that 634 g of the asphalt composition (AS-1) in Example 1 was changed to 724 g of the asphalt composition (AS-C5).

Example 6

An asphalt composition (AS-6) was obtained in the same manner as in Example 1 except that the polyester resin (A1) (acid value: 12.7 mgKOH/g) in Example 1 was changed to the polyester resin (A2) (acid value: 2.7 mgKOH/g).

A test piece was obtained in the same manner as in Example 1 except that 634 g of the asphalt composition (AS-1) in Example 1 was changed to 634 g of the asphalt composition (AS-6).

Example 7

An asphalt composition (AS-7) was obtained in the same manner as in Example 1 except that the polyester resin (A1) (acid value: 12.7 mgKOH/g) in Example 1 was changed to the polyester resin (A3) (acid value: 23.4 mgKOH/g).

A test piece was obtained in the same manner as in Example 1 except that 634 g of the asphalt composition (AS-1) in Example 1 was changed to 634 g of the asphalt composition (AS-7).

Example 8

As a binder mixture, 2200 g of straight asphalt (manufactured by Mexico FEPSA, asphaltene concentration in asphalt: 28% by mass) heated to 180° C. was placed in a stainless steel vessel of 3 L and stirred in 100 rpm, and 176 g of the polyester resin (A1) (8 parts by mass with respect to 100 parts by mass of asphalt) was gradually added and stirred in 300 rpm for 2 hours to prepare an asphalt composition (AS-8).

A test piece was obtained in the same manner as in Example 1 except that 634 g of the asphalt composition (AS-1) in Example 1 was changed to 652 g of the asphalt composition (AS-8).

Example 9

An asphalt composition (AS-9) was obtained in the same manner as in Example 8 except that the addition amount of the polyester resin (A1) in Example 8 was changed to 66 g (3 parts by mass with respect to 100 parts by mass of asphalt).

A test piece was obtained in the same manner as in Example 1 except that 634 g of the asphalt composition (AS-1) in Example 1 was changed to 621 g of the asphalt composition (AS-9).

Comparative Example 6

An asphalt composition (AS-C6) was obtained in the same manner as in Example 8 except that the polyester resin (A1) in Example 8 was not added.

A test piece was obtained in the same manner as in Example 1 except that 634 g of the asphalt composition (AS-1) in Example 1 was changed to 603 g of the asphalt composition (AS-C6).

Example 10

An asphalt composition (AS-10) was obtained in the same manner as in Example 1 except that the asphalt in Example 1 was changed to straight asphalt (manufactured by Ergon, Inc., Texas, asphaltene concentration in asphalt: 22% by mass).

A test piece was obtained in the same manner as in Example 1 except that 634 g of the asphalt composition (AS-1) in Example 1 was changed to 634 g of the asphalt composition (AS-10).

Comparative Example 7

An asphalt composition (AS-C7) was obtained in the same manner as in Example 10 except that the addition amount of the polyester resin (A1) in Example 10 was changed to 440 g (20 parts by mass with respect to 100 parts by mass of asphalt).

A test piece was obtained in the same manner as in Example 1 except that 634 g of the asphalt composition (AS-1) in Example 1 was changed to 724 g of the asphalt composition (AS-C7).

17

Comparative Example 8

An asphalt composition (AS-C8) was obtained in the same manner as in Example 10 except that the polyester resin (A1) in Example 10 was not added.

A test piece was obtained in the same manner as in Example 1 except that 634 g of the asphalt composition (AS-1) in Example 1 was changed to 603 g of the asphalt composition (AS-C8).

[Evaluation]

<Durability; Wheel Tracking Test>

The test piece was immersed in warm water set at 60° C. in a 60° C. constant temperature room, and the wheel was reciprocated on the test piece at a speed of 15 times/min using a wheel tracking tester manufactured by Iwata Kogyosho K.K. (load 1370N, steel wheel width 47 mm, linear pressure 291.5 N/cm), and the amount of displacement was measured when the number of passes was 1250 times and 2500 times. Other measurement conditions were in accordance with "B003 Wheel Tracking Test" described in "Handbook of Pavement Investigation and Examination Method" published by Japan Road Association.

In Examples 1 to 7 and Comparative Examples 1 to 5 in which modified asphalt was used, the amount of displacement when the tire passed 2500 times was measured. In Examples 8 to 10 and Comparative Examples 6 to 8 in which straight asphalt was used, the amount of displacement when the tire passed 1250 times was measured.

<Flow Value: Marshall Test>

Using a Marshall tester "Model No. -504" (manufactured by Nakajima Technology Inc.), a side surface of a cylindrical asphalt paving material layer test piece having a diameter of 100 mm and a thickness of about 63 mm was sandwiched between two arc-shaped loading plates, and a load was applied at a test piece temperature of 60° C. at a loading speed of 50 mm/min until the test piece was broken in the diametrical direction. The amount of deformation until the test piece was broken was defined as a flow value.

<Storage Stability of Asphalt Composition>

50 mL of the asphalt composition was poured into a sample bottle (inner radius 3.5 cm×height 7.8 cm) and stored in a 160° C. oven for 24 hours or 4 hours, and then the height of precipitation of the polyester in the asphalt composition was measured. The percentage of the height of the precipitate relative to the height of the precipitate when the entire amount of the polyester in the asphalt precipitated was calculated and used as an index of storage stability. The lower the value, the smaller the amount of precipitation and the better the storage stability.

In Examples 1 to 7 and Comparative Examples 1 to 5 in which modified asphalt was used, measurement was performed after storage for 24 hours, and in Examples 8 to 10 and Comparative Examples 6 to 8 in which straight asphalt was used, measurement was performed after storage for 4 hours. Further, in the comparative examples in which the polyester was not blended, the measurement was not performed because the polyester did not precipitate. In the table, it is written as "-".

TABLE 2

|  | Asphalt composition | Asphaltene content (% by mass) *1 | Polyester content (parts by mass) *2 | Wheel tracking test Displacement amount at 2500 times(mm) | Marshall test Flow value (1/100 cm) | Storage stability Storage at 160° C. for 24 hours |
|---|---|---|---|---|---|---|
| Example 1 | AS-1 | 22 | 5 | 9.5 | 26 | 21% |
| Example 2 | AS-2 | 22 | 8 | 9 | 24 | 48% |
| Example 3 | AS-3 | 22 | 3 | 10.5 | 25 | 18% |
| Comparative Example 1 | AS-C1 | 22 | 20 | 7 | 16 | 67% |
| Comparative Example 2 | AS-C2 | 22 | 0 | 17 | 18 | — |
| Example 4 | AS-4 | 28 | 8 | 4.5 | 20 | 42% |
| Example 5 | AS-5 | 28 | 3 | 5.5 | 21 | 16% |
| Comparative Example 3 | AS-C3 | 28 | 0 | 13.5 | 15 | — |
| Comparative Example 4 | AS-C4 | 15 | 5 | Unmeasurable | 23 | 89% |
| Comparative Example 5 | AS-C5 | 15 | 20 | 17 | 15 | 96% |

*1: Asphaltene content (% by mass) in 100% by mass of asphalt
*2: Polyester content (parts by mass) with respect to 100 parts by mass of asphalt

TABLE 3

| | Asphalt composition | Asphaltene content (% by mass) *1 | Polyester | Polyester acid value *2 | Polyester content (parts by mass) *3 | Wheel tracking test Displacement amount at 2500 times(mm) | Marshall test Flow value (1/100 cm) | Storage stability Storage at 160° C. for 24 hours |
|---|---|---|---|---|---|---|---|---|
| Example 1 | AS-1 | 22 | A1 | 12.7 | 5 | 9.5 | 26 | 21% |
| Example 6 | AS-6 | 22 | A2 | 2.7 | 5 | 10.5 | 22 | 43% |
| Example 7 | AS-7 | 22 | A3 | 23.4 | 5 | 14 | 23 | 18% |

*1: Asphaltene content (% by mass) in 100% by mass of asphalt
*2: Acid value of polyester (mgKOH/g)
*3: Polyester content (parts by mass) with respect to 100 parts by mass of asphalt

TABLE 4

| | Asphalt composition | Asphaltene content (% by mass) *1 | Polyester content (parts by mass) *2 | Wheel tracking test Displacement amount at 1250 times (mm) | Marshall test Flow value (1/100 cm) | Storage stability Storage at 160° C. for 24 hours |
|---|---|---|---|---|---|---|
| Example 8 | AS-8 | 28 | 8 | 11 | 12 | 43% |
| Example 9 | AS-9 | 28 | 3 | 13 | 14 | 21% |
| Comparative Example 6 | AS-C6 | 28 | 0 | 15.5 | 9 | — |
| Example 10 | AS-10 | 22 | 5 | 13 | 16 | 26% |
| Comparative Example 7 | AS-C7 | 22 | 20 | 10 | 10 | 93% |
| Comparative Example 8 | AS-C8 | 22 | 0 | 18 | 13 | — |

*1: Asphaltene content (% by mass) in 100% by mass of asphalt
*2: Polyester content (parts by mass) with respect to 100 parts by mass of asphalt From the comparison between Examples 1 to 3 and Comparative Example 2, the comparison between Examples 4 and 5 and Comparative Example 3, the comparison between Examples 8 and 9 and Comparative Example 6, and the comparison between Example 10 and Comparative Example 8, it is found that when the asphalt composition contains polyester, the durability of the pavement surface after construction is excellent, and rutting can be suppressed. It is also found that the higher the content of polyester in the asphalt composition is, the more excellent the durability of the pavement surface after construction is, and rutting can be suppressed.

In particular, in Comparative Example 5 in which the content of asphaltene in the asphalt was less than 18% by mass, rutting could not be sufficiently suppressed even when a large amount of polyester was blended, but in Example 3 in which the content of asphaltene in the asphalt was 22% by mass, rutting could be sufficiently suppressed even when only 3 parts by mass of polyester was blended. In Example 5 in which the content of asphaltene in the asphalt was 28% by mass, rutting could be significantly suppressed by blending only 3 parts by mass of polyester. From this, it can be seen that by using asphalt having a high content of asphaltene, the durability of the pavement surface after construction can be efficiently improved, and rutting can be significantly suppressed.

The invention claimed is:

1. An asphalt composition comprising asphalt and polyester, wherein a content of asphaltene in the asphalt is 18% by mass or more and 40% by mass or less, and a content of the polyester is 1 part by mass or more and 10 parts by mass or less with respect to 100 parts by mass of the asphalt.

2. The asphalt composition according to claim 1, wherein the polyester has an acid value of 2 mgKOH/g or more and 30 mgKOH/g or less.

3. The asphalt composition according to claim 1, wherein the polyester contains an alcohol component-derived constituent unit containing an alkylene oxide adduct of bisphenol A.

4. The asphalt composition according to claim 1, wherein the amount of the alkylene oxide adduct of bisphenol A in the alcohol component is 60 mol % or more, based on 100 mol % of the alcohol component.

5. The asphalt composition according to claim 1, wherein the polyester contains a carboxylic acid component-derived constituent unit containing an aromatic dicarboxylic acid compound in an amount of 50 mol % or more, based on 100 mol % of the carboxylic acid component.

6. The asphalt composition according to claim 5, wherein the aromatic dicarboxylic acid is at least one selected from the group consisting of terephthalic acid, phthalic acid, isophthalic acid, and naphthalene dicarboxylic acid.

7. The asphalt composition according to claim 1, wherein the polyester contains a carboxylic acid component-derived constituent unit containing an aliphatic dicarboxylic acid compound.

8. The asphalt composition according to claim 7, wherein the number of carbon atoms of the main chain of the aliphatic dicarboxylic acid is 3 or more and 10 or less.

9. The asphalt composition according to claim 1, further comprising a thermoplastic elastomer.

10. The asphalt composition according to claim 9, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic ester copolymer.

11. The asphalt composition according to claim 9, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer.

12. The asphalt composition according to claim 1, wherein the content of asphalt is 60% by mass or more and 98% by mass or less, based on 100% by mass of the asphalt composition.

13. An asphalt mixture comprising: the asphalt composition according to claim 1; and an aggregate.

14. A method for producing an asphalt mixture, comprising a step of mixing a heated aggregate, asphalt, and polyester, wherein an asphaltene content in the asphalt is 18% by mass or more and 40% by mass or less, and an addition amount of the polyester is 1 part by mass or more and 10 parts by mass or less with respect to 100 parts by mass of the asphalt.

15. The method for producing an asphalt mixture according to claim 14, wherein in the mixing step, (i) asphalt is added to and mixed with the heated aggregate, and then polyester is added thereto and mixed therewith, (ii) asphalt and polyester are simultaneously added to and mixed with the heated aggregate, or (iii) a mixture of asphalt and polyester heated and mixed in advance is added to and mixed with the heated aggregate.

* * * * *